United States Patent [19]

Farrow et al.

[11] Patent Number: 5,705,003
[45] Date of Patent: Jan. 6, 1998

[54] METHOD FOR MANUFACTURING A LINEAR VIBRATION WELDED CARPETED PANEL

[75] Inventors: Samuel Farrow, Utica; Lee Avrial Walker, Shelby Township; Paul E. Debbaudt, Utica; Aaron S. Wisniewski, Troy, all of Mich.

[73] Assignee: Ford Motor Company, Dearborn, Mich.

[21] Appl. No.: 651,187

[22] Filed: May 17, 1996

Related U.S. Application Data

[62] Division of Ser. No. 993,542, Dec. 21, 1992.
[51] Int. Cl.$^6$ .................... B29C 65/06; B32B 31/16
[52] U.S. Cl. .................... 156/73.5; 156/73.6; 156/228; 156/309.6
[58] Field of Search .................... 156/73.5, 75.6, 156/91, 308.2, 309.6, 228

[56] References Cited

U.S. PATENT DOCUMENTS

| | | | |
|---|---|---|---|
| 4,337,218 | 6/1982 | Byrd et al. | 156/91 |
| 4,339,289 | 7/1982 | Lankard | 156/91 |
| 5,026,445 | 6/1991 | Mainolfi et al. | 156/73.5 |
| 5,462,786 | 10/1995 | Van Ert | 156/228 |

*Primary Examiner*—Richard Crispino
*Attorney, Agent, or Firm*—Damian Porcari

[57] ABSTRACT

The present invention relates to a method of producing a carpeted vehicle interior panel. A rigid backing having a carpeted surface and a mating surface is molded such that the backing mating surface is 3-dimensional and self-supporting after molding. The backing is overlaid atop the panel with the mating surface juxtaposed a mating surface of the panel. The backing is secured to the panel by linear welding.

5 Claims, 2 Drawing Sheets

METHOD FOR MANUFACTURING A LINEAR VIBRATION WELDED CARPETED PANEL

This is a divisional of copending application Ser. No. 07/993,542 filed Dec. 21, 1992.

BACKGROUND OF THE INVENTION

1. Field of the Invention

The present invention relates to a method of attaching a carpeted backing to a thermoplastic panel. More specifically, the invention relates to the manufacture of a carpeted interior trim panel.

2. Description of the Related Art

Various interior vehicle trim panels are covered with a carpeting to provide an aesthetic appearance. Mechanical attaching means such as staples, glues, and fasteners have been used to secure the carpet to the panel. With panels made of a thermoplastic material, various methods of bonding the carpet to the panel without the use of fasteners or adhesives are possible.

Carpeting having a latex backing may be secured to a thermoplastic panel by welding. Various types of welding are possible including vibration, Ultrasonic, hot plate, solvent, and hot air. U.S. Pat. No. 5,076,870 teaches a method of attaching a carpet to a door using ultrasonic or hot plate welding. The carpet is attached to a intermediate layer made from recycled rubber. To promote adhesion between the carpet and door panel, a nonwoven intermediate layer is attached to the rubber intermediate layer. During the welding process, molten material from the panel fuses to the nonwoven layer.

Various problems exist when attempting to use a rubber based flexible laminate with linear welding. The use of a resilient rubber intermediate layer limits the application of this method to relatively flat surfaces. It is difficult to precisely align the carpet piece onto a highly contoured panel and vibrational energy is not efficiently transmitted through the rubber intermediate layer to create heat at the interface between the carpet and panel.

U.S. Pat. No. 5,026,445 which teaches a method of linearly welding a carpet to a door panel. A backing material may be attached to the carpet to provide a bond between the carpet and the panel. However, this patent also does not address the problems of attaching a carpet to a highly contoured surface.

SUMMARY OF THE INVENTION

The present invention relates to a method of producing a carpeted vehicle interior panel comprising the steps of: providing a rigid backing having a carpeted surface and a mating surface; molding the backing such that the backing mating surface is 3-dimensional, the backing being self-supporting after molding; overlaying the backing atop the panel, the mating surface juxtaposed a mating surface of the panel; and securing the backing to the panel by linear welding, whereby the backing mating surface welds to the panel mating surface.

A carpet is secured to a rigid backing. The backing is molded to mate with the surface of a highly contoured panel. By forming the backing from a rigid material, it becomes self-supporting and maintains a 3-dimensional highly contoured shape separate and apart from the panel. Use of a rigid backing facilitates manufacturing of the finished assembly. Positioning means on the backing align with positioning means on the panel to precisely locate the carpet piece with the panel. A linear welder is placed atop the carpet piece and vibrates in a direction generally parallel with the panel. The vibrational energy causes the mating surfaces between the backing and panel to heat. Either the backing or panel or both may soften and partially melt. When the softened materials are compatible, they form a weld. Incompatible materials may also be secured through linear welding by having a permeable layer or surface mediate the backing and panel. The softened material flows into cavities in the permeable layer. Once cooled, they form a secure and permanent attachment. The rigid backing enhances the appearance of the panel especially after exposure to elevated temperatures. Elevated temperatures may cause deformations or wrinkles in the panel's surface. By providing a rigid preshaped self-supporting backing to the carpet, small deformations or wrinkles in the panel are not visible through the carpeted surface.

DESCRIPTION OF THE PREFERRED EMBODIMENTS

Illustrated in FIGS. 1–4 is a method of manufacturing a carpeted interior vehicle door. Other items are also possible using the invention described such as panel shelves, kick panels, trunk liners, head liners as well as others. Carpet 10 is secured to rigid backing 12. Various types of woven or nonwoven carpetings are useful for interior vehicle applications and provide an aesthetic appearance. Backing 12 may be made from a variety of materials which are capable of shaping or molding to provide a 3-dimensional self-supporting contoured shape. Typical examples include blends of polypropylene and wood pulp, thermoplastics, bulk molding compound and thermoset materials. The thickness of backing 12 is selected to enable the material to maintain a rigid self-supporting configuration. When using a 50-50 blend of polypropylene and wood pulp, a thickness of approximately 0.04 inches is generally sufficient to provide a self-supporting rigid shape.

Figure 1:
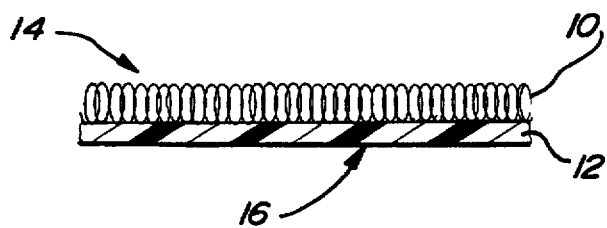
FIG. 1 is a sectional view of the carpet and backing.
Figure 2:
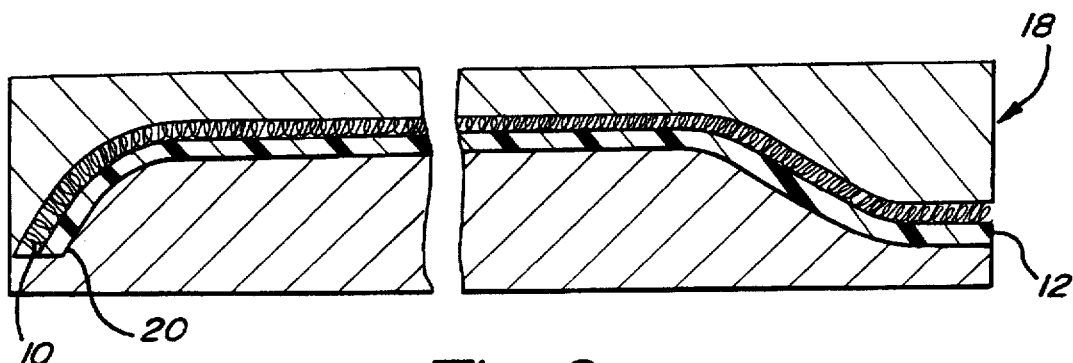
FIG. 2 illustrates the molding of the carpet piece into a 3-dimensional shape.
Figure 3:
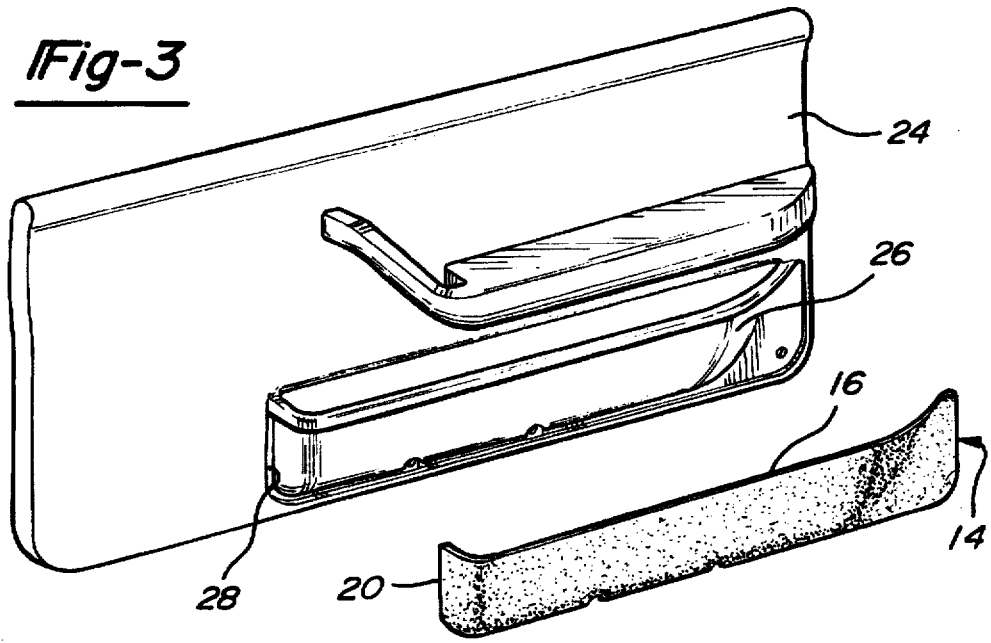
FIG. 3 is an exploded view of the carpet piece and panel.

The carpet 10 and backing 12 are laminated to form carpet piece 14. Mating surface 16 on the interior face of backing 12 is secured to the vehicle panel. Carpet piece 14 is placed within shaping tool 18 and formed into a 3-dimensional highly contoured shape. Shaping thermoplastic or bulk molding compound thermoset materials may require additional heating to form carpet piece 14 into the desired shape. It may be desirable to form an inwardly turned edge 20 to fit within a groove to aid in retention and to conceal a loose or stray carpet fiber. Molded carpet piece 14 is removed from tool 18 and placed atop vehicle interior trim panel 24 as shown in FIG. 3. Panel 24 has a 3-dimensional contoured mating surface 26 receiving mating surface 16 in intimate contact. Groove 28 receives edge 20. Edge 20 and groove 28 act as positioning means to align and locate carpet piece 14 onto panel 24.

Figure 4:
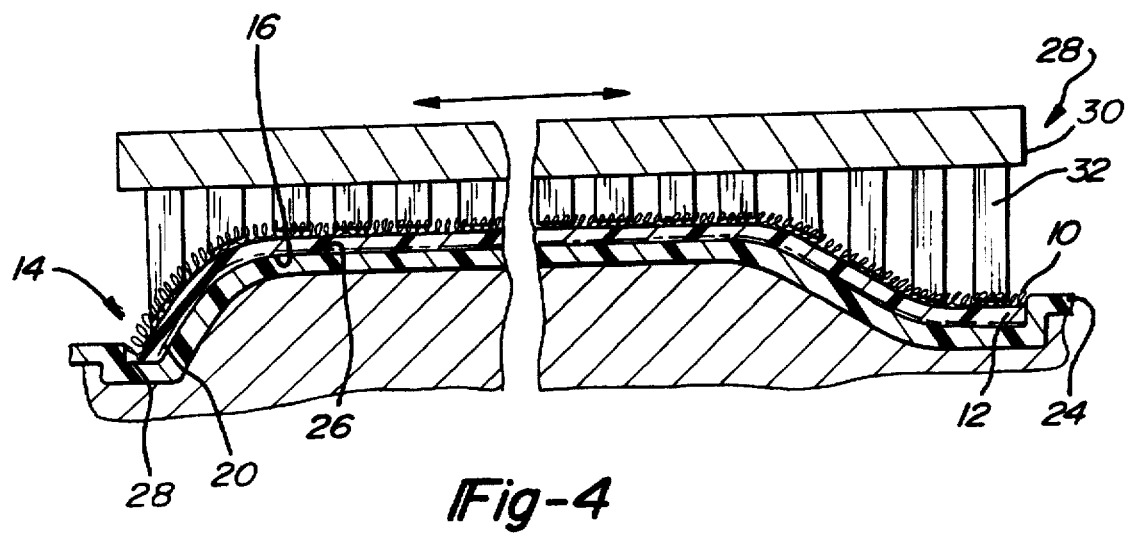
FIG. 4 is a sectional view of the carpet piece being linearly welded to the panel.

Panel 24 and carpet piece 14 are placed within a linear vibration welding tool 28 as shown in FIG. 4. Mating surface 16 is juxtaposed mating surface 26. Platten 30 has a series of downwardly extending energy directors 32. Director 32 generally conform to the surface of carpet 10. Directors 32 are generally pointed to grab carpet 10 and transfer linear vibrational energy to backing 12. Tool 28 can be made to vibrate in more than one plane. This is especially useful when welding articles which are very highly contoured.

Linear vibrational energy in a direction generally parallel panel 24 is applied between carpet piece 14 and panel 24. The vibrational energy causes a friction between mating surfaces 16, 26 causing them to heat. Either one or both mating surfaces 16, 26 soften and partially melt. When panel 24 and backing 12 are made from the same or similar material, the softened mating surfaces 16, 22 blend and form a homogeneous weld. For example, crystalline material such as polypropylene and polyethylene would blend together. Amorphous materials such as poly vinyl chloride (PVC) and acrylonitrile butadiene styrene (ABS) also blend together. A crystalline material would not blend with an amorphous material. For example, it is difficult to weld polypropylene to ASB. The incompatible materials do not blend well to form a secure weld. In this case, an intermediate layer is used to weld the dissimilar materials.

Figure 5:
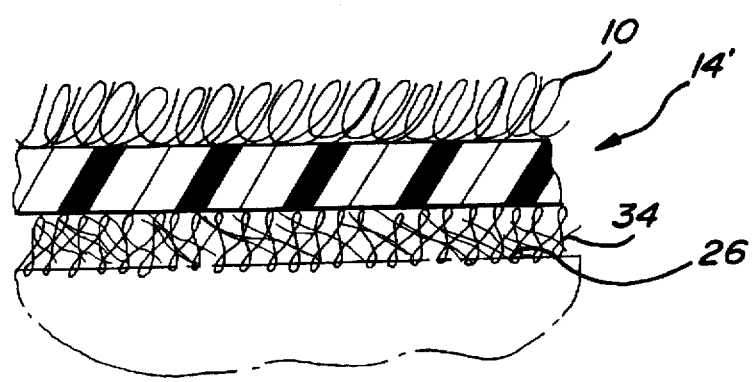
FIG. 5 is an alternative embodiment of the carpet.

In an alternative embodiment of the invention illustrated in FIG. 5, carpet piece 14' has a permeable layer 34 attached opposite carpet 10. Permeable layer 34 permits the molten material of mating surface 26 to flow and secure to layer 34. Permeable layer 34 may be made from a woven or non-woven fabric such as polyester, glass fibers, arimid fibers, and carbon fibers. These materials resist melting or softening during the vibration welding process. Other permeable materials and fabrics are also suitable for the present invention. Use of permeable layer 34 permits vibration welding of dissimilar materials. In this way, a polypropylene-wood pulp backing may be bonded to an ABS panel. Permeable layer 34 has a high surface area having an irregular interface which receives molten material from mating surface 26. Once the molten material cools, it forms a strong mechanical bond between the carpet piece and panel.

When attaching dissimilar materials, the importance of the molded rigid backing 12 becomes more important. Dissimilar materials have different physical characteristics as they age or when subjected to extreme temperatures. One material may tend to elongate more than another material with time or temperature. This difference may be manifested in wrinkles or a wavy surface. By premolding backing 12 into the desired shape, lighter and lower cost materials may be used for panel 24. It has been found that using a premolded rigid backing 12 in place of unback carpet provides a longer lasting wrinkle-free surface appearance. Panel 24 may be made thinner and lighter thereby saving both material and cost. Premolding carpet piece 14 also facilitates positioning the carpet on the door and reduces the trimming necessary to provide a finished appearance.

The invention has been described as a carpeted door trim. One of ordinary skill in the art may modify methods and articles taught herein without departing from the spirit and scope of the appended claims.

I claim:

1. A method of producing a carpeted vehicle interior panel comprising the steps of:

providing a rigid backing having a carpeted surface and a mating surface;

molding said backing such that said backing mating surface is three-dimensionally contoured shaped, said backing being self-supporting after molding;

overlaying said backing atop a panel, said backing mating surface juxtaposed a three-dimensionally contoured shaped mating surface of said panel; and securing said backing to said panel by linear vibration welding, whereby said backing mating surface welds to said panel mating surface to form said carpeted vehicle interior panel.

2. The method of claim 1, further comprising the step of:

rendering said backing mating surface permeable to said welded panel mating surface, said welding causing said panel mating surface to soften and permeate said backing mating surface.

3. The method of claim 2, wherein said rendering step comprises:

securing a permeable layer to said backing, said permeable layer juxtaposed said panel mating surface, said welding causing said panel mating surface to soften and permeate said permeable layer.

4. The method of claim 1, further comprising forming positioning means on said backing mating surface and said panel mating surface, and aligning said backing positioning means with said panel positioning means prior to said welding step.

5. A method of producing a carpeted vehicle interior panel comprising the steps of:

providing a rigid backing having a carpeted surface and a permeable layer;

molding said backing such that said backing is three-dimensionally contoured shaped and self-supporting and forming positioning means in said backing;

overlaying said backing atop a panel, said backing positioning means aligning with positioning means on said panel, said permeable layer juxtaposed a three-dimensionally contoured shaped mating surface of said panel; and securing said backing to said panel by linear vibration welding, said welding causing said panel mating surface to soften and permeate said permeable layer to form said carpeted vehicle interior panel.

* * * * *